(12) United States Patent  (10) Patent No.: US 8,096,287 B2
Rasmussen  (45) Date of Patent: Jan. 17, 2012

(54) FUEL COOLER

(76) Inventor: Stephen Gardner Rasmussen, Ft. Myers, FL (US)

( * ) Notice: Subject to any disclaimer, the term of this patent is extended or adjusted under 35 U.S.C. 154(b) by 551 days.

(21) Appl. No.: 12/315,145

(22) Filed: Nov. 28, 2008

(65) Prior Publication Data

US 2009/0139498 A1    Jun. 4, 2009

Related U.S. Application Data

(60) Provisional application No. 61/005,242, filed on Dec. 4, 2007.

(51) Int. Cl.
    *F02M 31/00* (2006.01)
(52) U.S. Cl. .......................................... 123/541
(58) Field of Classification Search .......... 123/540–542; 210/774
    See application file for complete search history.

(56) References Cited

U.S. PATENT DOCUMENTS

| 4,058,096 | A  | * | 11/1977 | Brown   | 123/542 |
| 6,440,317 | B1 | * |  8/2002 | Koethe  | 210/774 |
| 6,675,781 | B1 | * |  1/2004 | Markley | 123/542 |
| 7,658,183 | B1 | * |  2/2010 | Johnson | 123/540 |

* cited by examiner

*Primary Examiner* — M. McMahon

(57) ABSTRACT

A liquid fuel cooling system includes an intake line, a heat exchanger, an exhaust fine, a fuel pump, and an amount of frozen carbon dioxide. The intake line connects the heat exchanger to a fuel source, and the exhaust line connects the heat exchanger to a fuel destination. The fuel pump moves fuel from the fuel source, through the intake line, through the heat exchanger, through the exhaust line, and to the fuel destination. The frozen carbon dioxide is disposed against at least a portion of the heat exchanger to draw heat away from the fuel. Optionally, a system can include dual heat exchanger connected via a bridge line, with the frozen carbon dioxide being disposed there between.

10 Claims, 5 Drawing Sheets

FUEL COOLER

This application claims priority to Provisional Application 61/005,242 filed Dec. 4, 2007.

FIELD OF THE INVENTION

The present invention relates to fuel coolers.

BACKGROUND OF THE INVENTION

Liquid and gaseous fuels can be used in conjunction with internal combustion engines. An internal combustion engine can rely upon the combustion of fuel and an oxidizer (e.g., air), which occurs in a combustion chamber. The resulting exothermic reaction results in gases at high temperatures and pressures, which are permitted to expand. Useful work is created by this reaction. The expanding hot gases directly cause movement of solid engine parts, such as pistons or rotors, ultimately producing utilizable work.

BRIEF SUMMARY OF THE INVENTION

It is, therefore, an object of the present invention to provide a fuel cooling system. In an exemplary embodiment, the present invention can be embodied in a fuel cooling system that includes the following: an intake line, connected to a fuel source, and for carrying the fuel from the fuel source; a heat exchanger, having an exterior surface, and being connected to the intake line; an exhaust line, connected to the heat exchanger, and for carrying the fuel away from the heat exchanger to a fuel destination; a fuel pump, connected to the intake line, and for moving the fuel from the fuel source, through the intake line, through the heat exchanger, through the exhaust line, and to the fuel destination; and an amount of frozen carbon dioxide disposed against at least a portion of the exterior surface of the heat exchanger to transfer heat away from the fuel.

The following, independently or in combination (two or more thereof), are additional exemplary embodiments or optional aspects of the present invention:

the system can further include a housing having a lid, an intake aperture, and an exhaust aperture; wherein the housing surrounds the heat exchanger and the amount of frozen carbon dioxide, the intake Line connects to the heat exchanger via the intake aperture, the exhaust line connects to said heat exchanger via the exhaust aperture, and the lid is closebly openable to receive the amount of frozen carbon dioxide;

the housing can be substantially air-tight and the housing can include a valve for releasing air pressure from within the housing;

the valve can release at least a portion of the air-pressure from within the housing if the air-pressure exceeds a predetermined amount;

the fuel pump can be connected directly to the intake line;

the housing can further surround at least one holding element that limits the amount of frozen carbon dioxide from moving in at least one direction;

the at least one holding element can be formed, at least in part, from a foam material;

the heat exchanger can include a plurality of fins, and the amount of frozen carbon dioxide can be disposed against at least one of the plurality of fins;

the fuel destination can be the fuel source; and the fuel destination can be a combustion chamber.

In another exemplary embodiment, the present invention can be embodied in a fuel cooling system that includes an intake line, connected to a fuel source, and for carrying the fuel from the fuel source; a first heat exchanger, having a first heat exchanger exterior surface, and being connected to the intake line; a second heat exchanger, having a second heat exchanger exterior surface, and being connected to the first heat exchanger via a bridge line; an exhaust line, connected to the second heat exchanger, and for carrying the fuel away from the second heat exchanger to a fuel destination; a fuel pump, connected to the intake line, and for moving the fuel from the fuel source, through the intake line, through the first heat exchanger, through the bridge line, through the second heat exchanger, through the exhaust line, and to the fuel destination; and an amount of frozen carbon dioxide disposed against at least a portion of the first heat exchanger exterior surface and at least a portion of the second heat exchanger exterior surface to transfer heat away from the fuel.

The following, independently or in combination (two or more thereof), are additional exemplary embodiments or optional aspects of the present invention:

the system can further include a housing having a lid, an intake aperture, and an exhaust aperture; wherein the housing surrounds the first and second heat exchangers and the amount of frozen carbon dioxide, the intake line connects to the heat exchanger via the intake aperture, the exhaust line connects to said second heat exchanger via the exhut aperture, and the lid is openable to receive the amount of frozen carbon dioxide;

the housing can be substantially air-tight and the housing can include a valve for releasing air pressure from within the housing;

the valve can release at least a portion of the air-pressure from within the housing if the air-pressure exceeds a predetermined amount;

the fuel pump can be connected directly to the intake line;

the housing can further surround at least one holding element that limits the amount of frozen carbon dioxide from moving in at least one direction;

the at least one holding element can be formed, at least in part, from a foam material;

the first and/or second heat exchangers can include a plurality of fins, and the amount of frozen carbon dioxide can be disposed against at least one of the plurality of fins;

the fuel destination can be the fuel source;

the fuel destination can be a combustion chamber; and the bridge line can be formed of a flexible material to allow a distance between said first and second heat exchangers to shorten as said amount of frozen carbon dioxide sublimates.

Further, the present invention can be embodied in complementary methods of cooling a fuel.

BRIEF DESCRIPTION OF THE DRAWINGS

The present invention is illustrated by way of example, and not in limitation, in the figures of the accompanying drawings, in which.

DETAILED DESCRIPTION OF THE INVENTION

The invention will now be described in more detail by way of example with reference to the embodiments shown in the accompanying figures. It should be kept in mind that the following described embodiments are only presented by way of example and should not be construed as limiting the inventive concept to any particular physical configuration or order.

Figure 1:
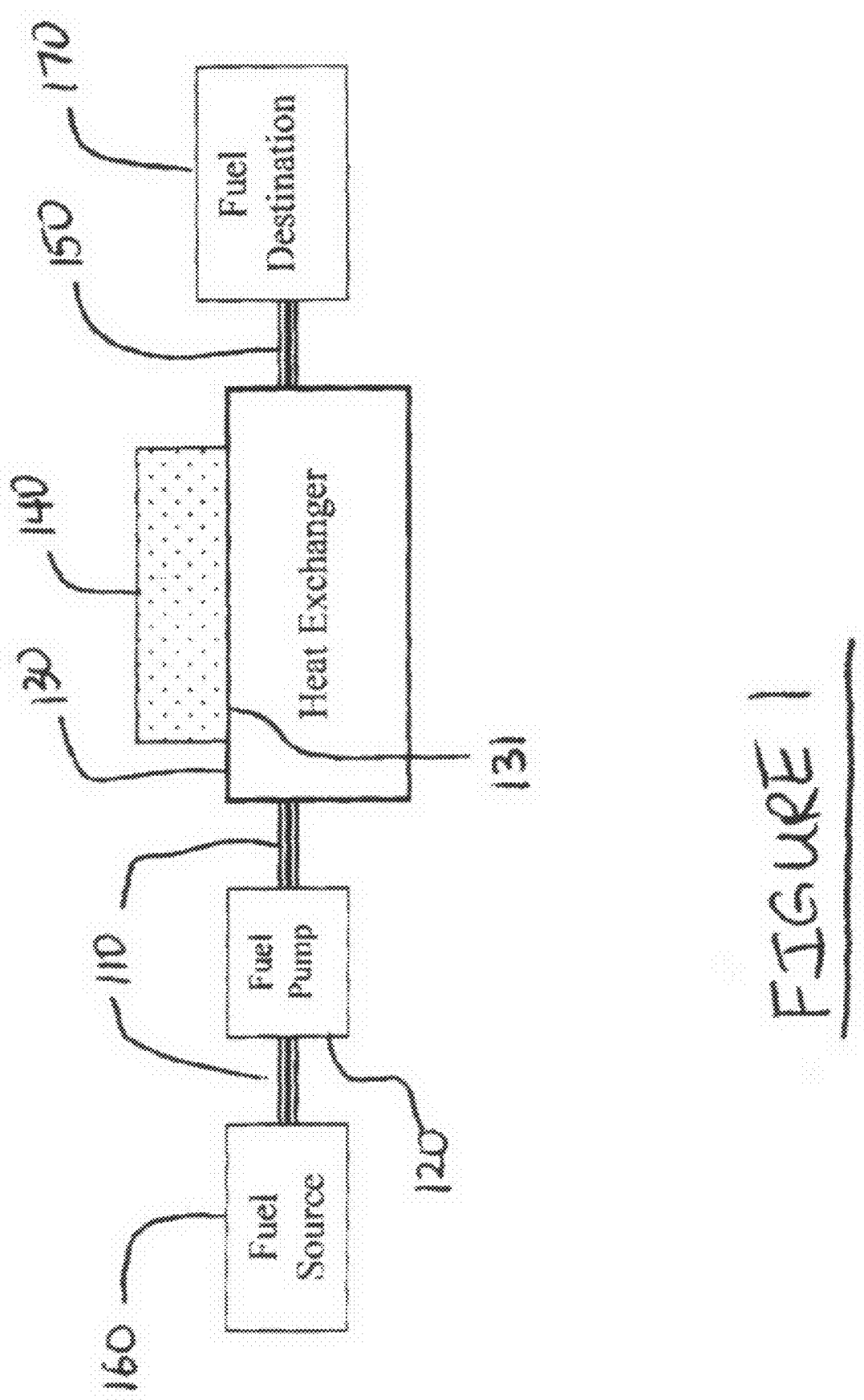
FIG. 1 illustrates an exemplary embodiment of the present invention, in which a fuel cooling system includes an intake line, a fuel pump, a heat exchanger, an amount of frozen carbon dioxide, and an exhaust line.

FIG. 1 illustrates an exemplary embodiment of the present invention, in which a fuel cooling system includes an intake line 110, a fuel pump 120, a heat exchanger 130, an amount of frozen carbon dioxide 140, and an exhaust line 150.

As shown in FIG. 1, intake line 110 is connected to fuel source 160, and its function is to carry a fuel (not shown) from the fuel source to heat exchanger 130. Fuel pump 120 can be connected to intake line 110 either directly (shown) or indirectly (not shown; e.g., fuel pump 120 can be connected to exhaust line 150 if desired). In an exemplary aspect, fuel pump 120 can be connected to intake line 110 before heat exchanger 130, to avoid unnecessary cooling of fuel pump 120, if that is the case. In other words, where fuel pump 120 is connected after heat exchanger 130, it is possible that it may reduce the cooling efficiency of the system on the fuel (For example, fuel pump 120 may increase the temperature of the fuel.)

Fuel pump 120 can be mechanical and/or electrical. Further, fuel pump 120 can be a pre-existing component of an engine, such as where a system is integrated into a pre-existing combustion engine, such as one existing in a motor vehicle, boat, or plane, for example and not in limitation. Fuel pump 120 causes fuel to move from fuel source 160, through intake line 110, through heat exchanger 130 (where fuel cooling is effectuated), through exhaust line 150, and ultimately to fuel destination 170.

Heat exchanger 130, which has an exterior surface 131, receives the fuel from fuel source 160 via intake line 110, and provides heat transfer from the fuel (as it flows through the heat exchanger) to at least a portion of the exterior surface of the heat exchanger.

An amount of frozen carbon dioxide 140 is disposed against at least a portion of the exterior surface 131, such that it absorbs heat transferred from the fuel. In an exemplary aspect, heat exchanger 130 can be a radiator, and can have at least one fin (not shown) to increase the surface area of exterior surface 131. Frozen carbon dioxide 140 sublimates as heat is transferred from the fuel to the frozen carbon dioxide. In another exemplary aspect, heat exchanger 130 can include a plurality of fins (not shown) against which frozen carbon dioxide 140 can be disposed. During the sublimation process, it has been observed that frozen carbon dioxide tends to sublimate towards the fins, resulting in frozen portions existing between the fins (in other words, the fins "melting" their way into the frozen carbon dioxide). This result provides a benefit of having the frozen carbon dioxide being held in place during sublimation and the cooling of fuel.

Exhaust line 150 is connected to heat exchanger 130 and a fuel destination 170, and its function is to carry the coole fuel from the heat exchanger to the fuel destination.

Figure 2:
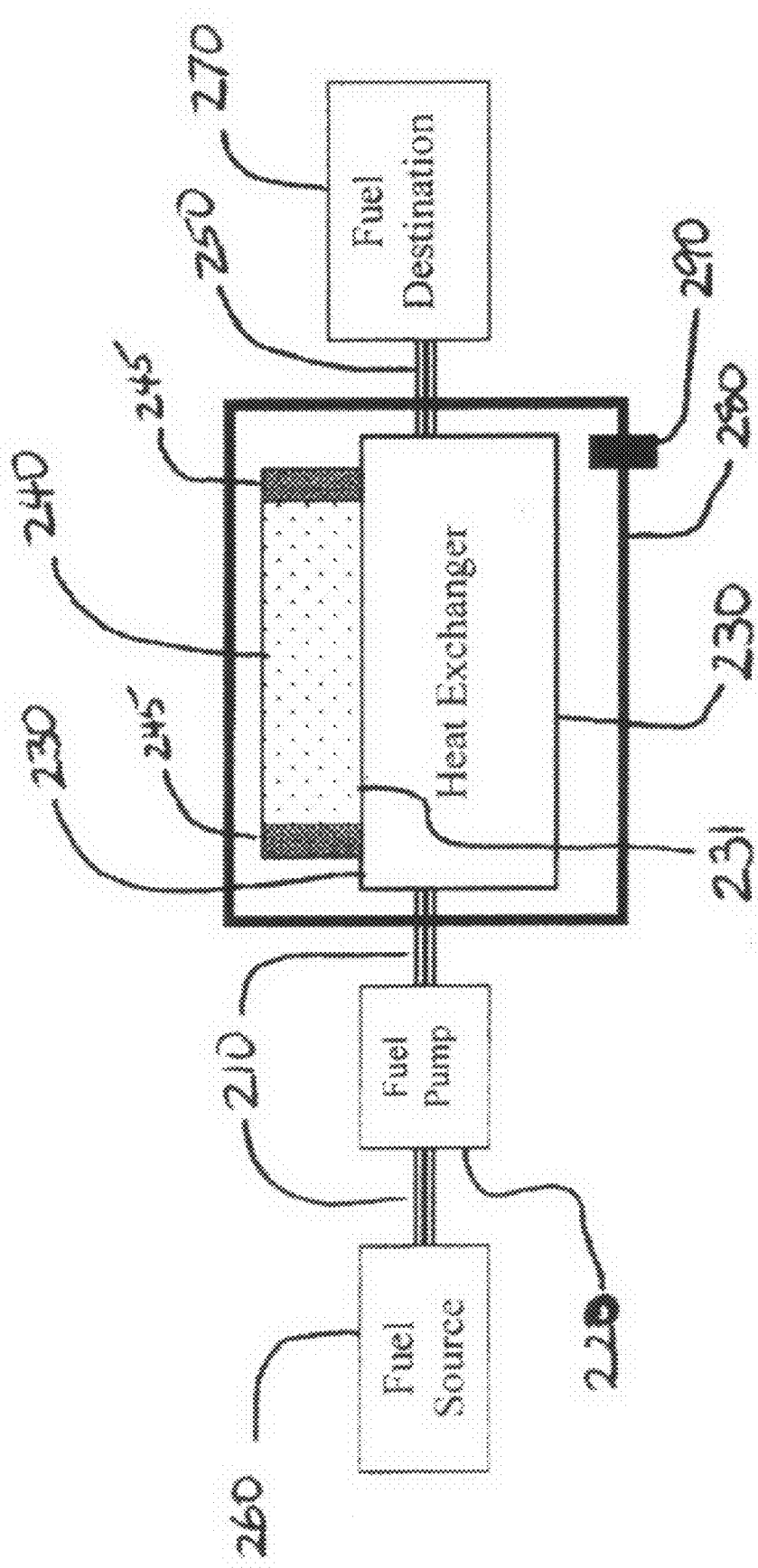
FIG. 2 illustrates an exemplary aspect of the present invention, in which a fuel cooling system can include a housing having an openable lid.

FIG. 2 illustrates another exemplary embodiment of the present invention, in which a fuel cooling system 200 can include a housing 280 that surrounds heat exchanger 230 and frozen carbon dioxide 240. In an exemplary aspect, housing 280 can provide an insulating function, so as to reduce the transfer of heat from sources other than fuel via heat exchanger 230. An insulating characteristic of housing 280 can be achieved, for example, via the material (for example, the type, thickness, etc.) from which the housing is formed and/or an air-tight (or substantially air-tight) design of the housing. In one exemplary embodiment, housing 280 can be formed from a plastic, such as a high-density polyethylene, for example and not in limitation. Housing 280 can be formed from any suitable material desired, and similarly, can be shaped in any suitable manner desired.

In another exemplary aspect of the present invention, housing 280 can be at least substantially air-tight and include a valve 290 for releasing air pressure that builds up as frozen carbon dioxide 240 sublimates.

Figure 3:
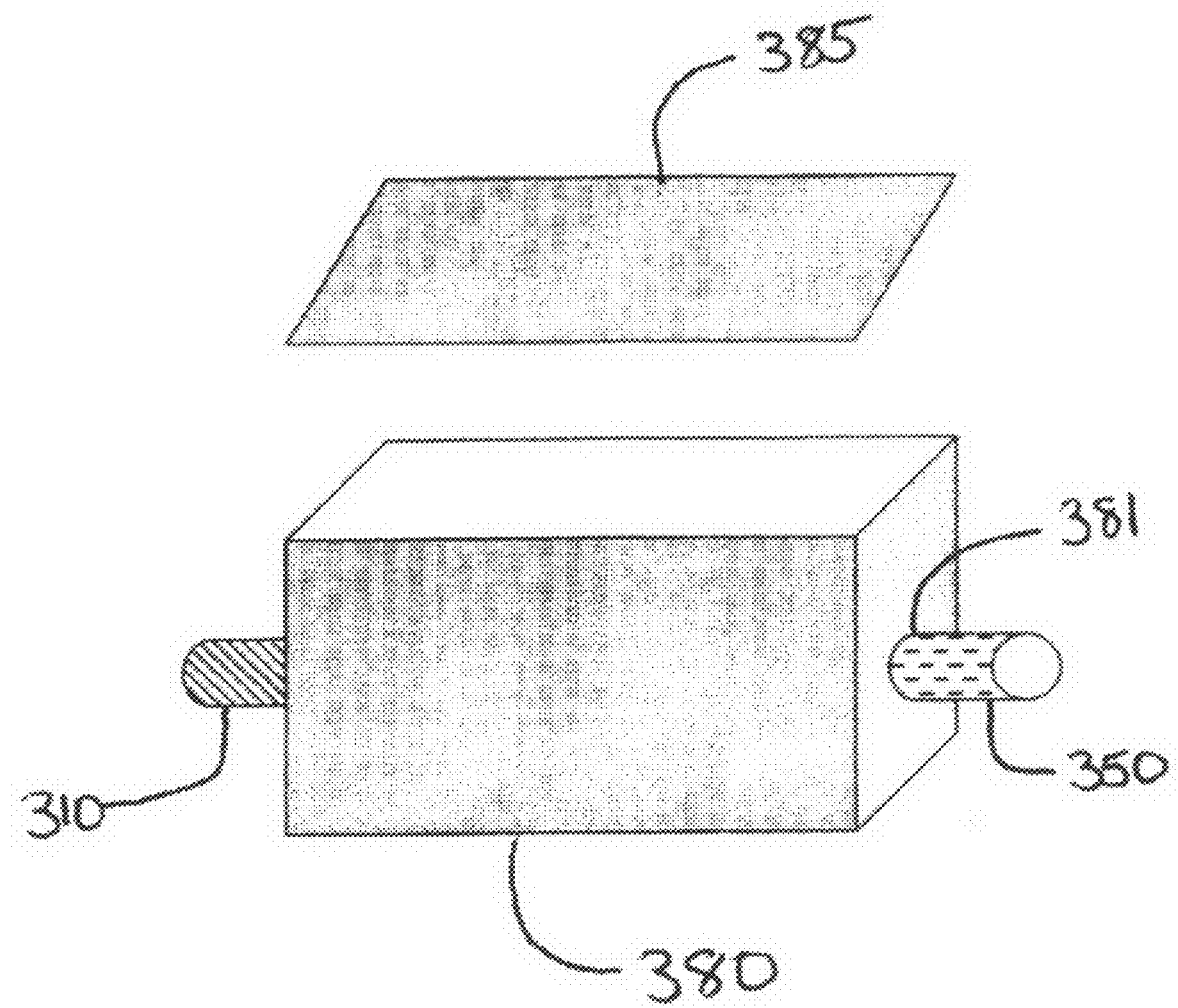
FIG. 3 illustrates an exemplary embodiment of the present invention, in which a housing, having an optional pressure-release valve, surrounds a heat exchanger, an amount of frozen carbon dioxide, and holding elements securing the frozen carbon dioxide.

FIG. 3 illustrates an additional exemplary aspect of the present invention, in which housing 380 can include a lid 385 through which frozen carbon dioxide can be added. As illustrated, intake line 310 and exhaust line 350 can enter housing 380 through an intake aperture (not shown) and an exhaust aperture 381, respectively. In use, lid 385 can be opened so frozen carbon dioxide can be added, and subsequently closed to provide at least a substantially air-tight seal. The at least substantially air-tight seal can be achieved via physical design of housing 380 and lid 385 and/or inclusion of one or more gaskets (not shown) or other insulating material desired. Lid 385 can be attached to housing 380 in any suitable manner desired, for example and not in limitation, by way of one or more hinges and/or clasps. Notably, housing 380 and lid 385 can be any shape or size desired.

Figure 4:
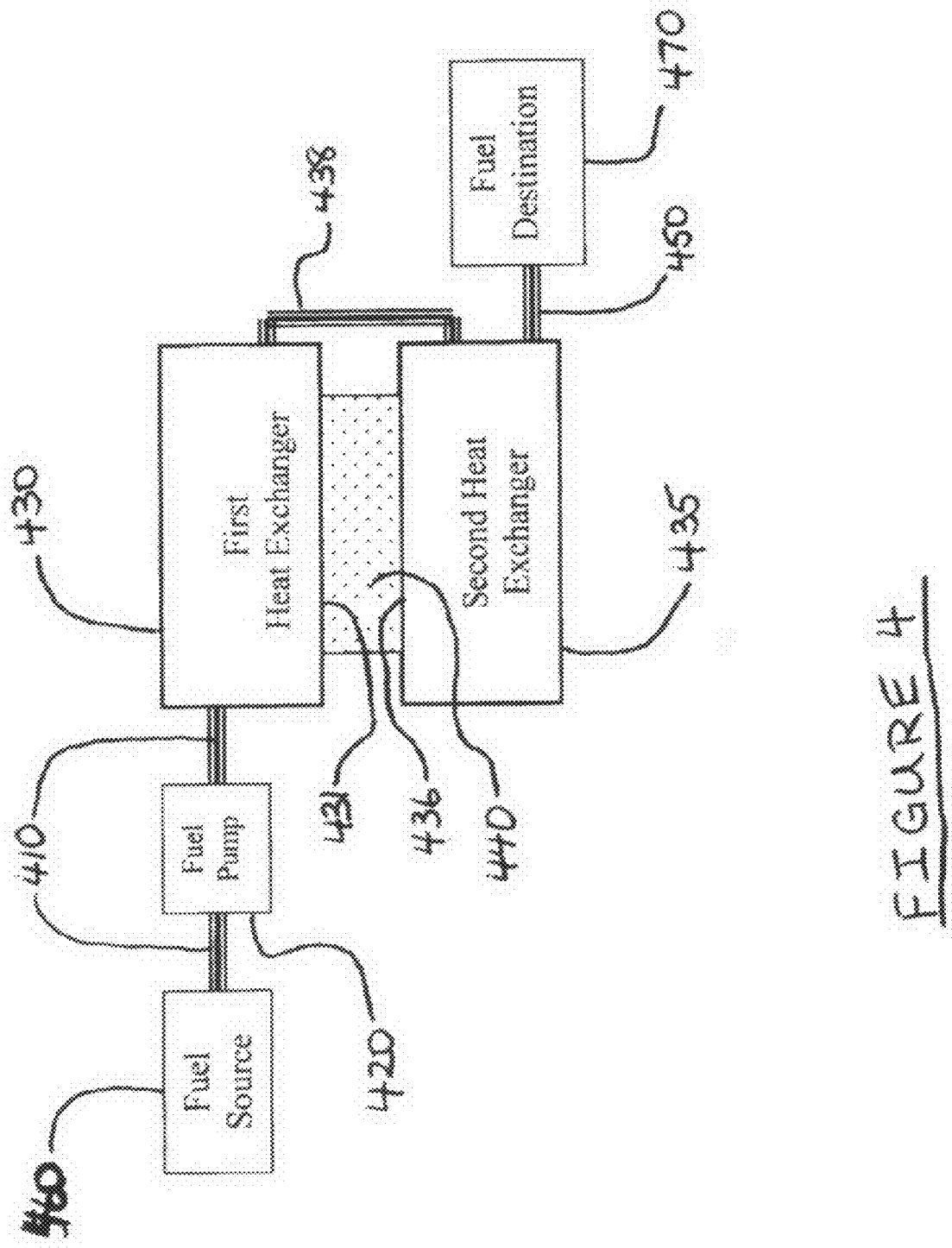
FIG. 4 illustrates another exemplary embodiment of the present invention, in which a fuel cooling system includes an intake line, a first heat exchanger, a second heat exchanger, an amount of frozen carbon dioxide disposed against the first and second heat exchangers, an exhaust line, and a fuel pump.

As illustrated in FIG. 4, according to another exemplary embodiment of the present invention, a fuel cooling system includes an intake line 410, a fuel pump 420, a first heat exchanger 430, a second heat exchanger 435, an amount of frozen carbon dioxide 440, and an exhaust line 450. First and second heat exchangers 430, 435 are connected via bridge line 438.

Accordingly, fuel pump 420 causes fuel to move from fuel source 460, through intake line 410, through first heat exchanger 430 (where a first stage of cooling is effectuated), through bridge line 438, through second heat exchanger 435 (where a second stage of cooling is effectuated), through exhaust line 450, and ultimately to fuel destination 470.

As illustrated, frozen carbon dioxide 440 is disposed between first 430 and second heat exchangers 435, such that at least a portion of each exterior surface 431, 436 are in contact with the frozen carbon dioxide, and therefore, both exchangers effectuate cooling of the fuel. In an exemplary aspect of the invention, bridge line 438 can be formed of a flexible material so as to allow the distance between the exchangers 430, 435 to increase to allow placement of frozen carbon dioxide 440 there between, as well as to allow the distance to decrease as frozen carbon dioxide sublimates. In an exemplary aspect of the invention, with a dual exchanger 430, 435 configuration, frozen carbon dioxide 440 can be held in place by the exchangers during sublimation. And as noted above, as the frozen carbon dioxide sublimates, the distance between the exchangers decreases. A decrease in distance can be caused by one or more of the following: the sublimation process, the force of gravity, or a mechanically created force, such as one via a spring or an amount of foam, for example and not in limitation.

Figure 5:
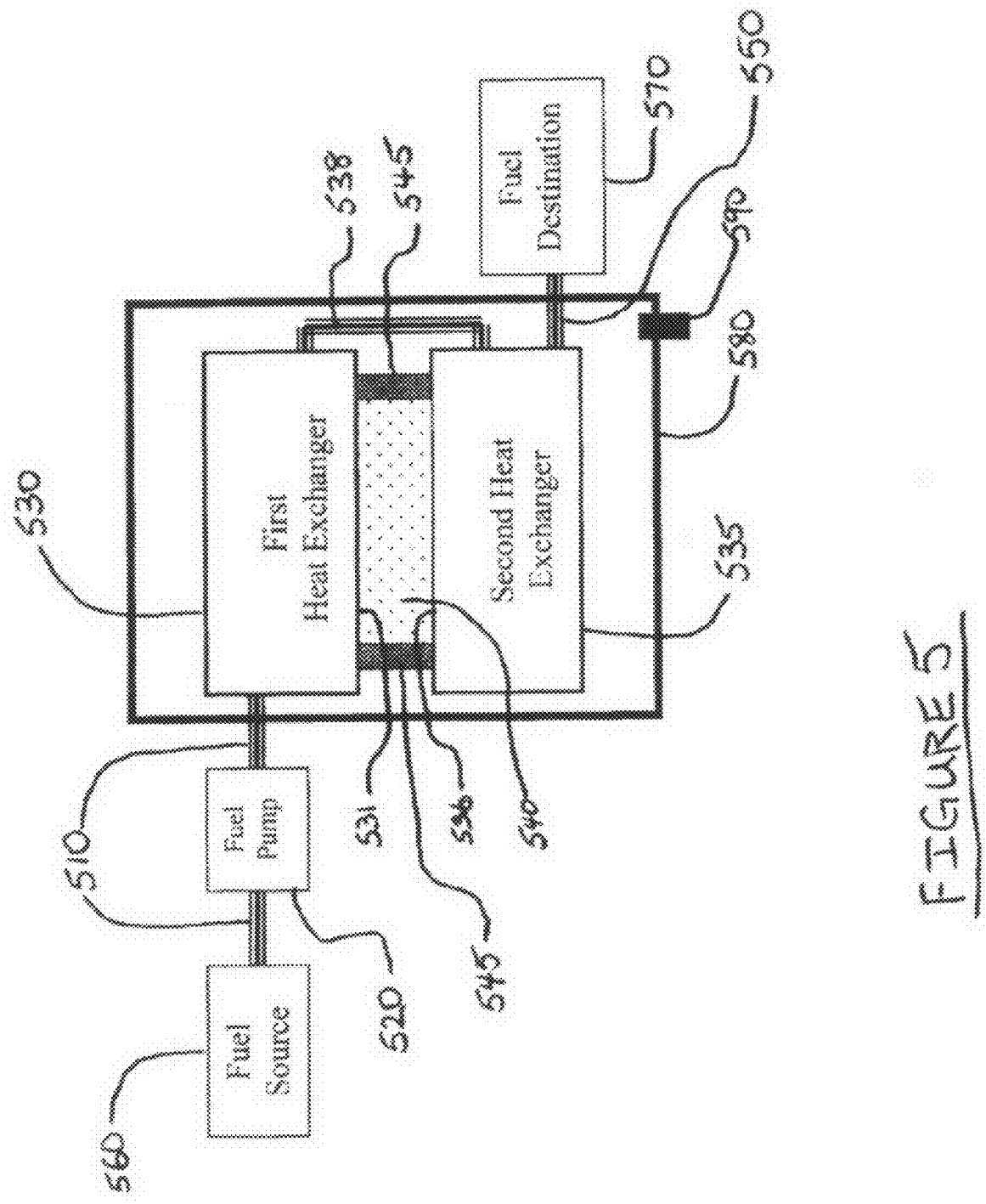
FIG. 5 illustrates another exemplary embodiment of the present invention, in which a housing, having an optional pressure-release valve, surrounds a heat exchanger, an amount of frozen carbon dioxide, and holding elements securing the frozen carbon dioxide.

As illustrated in FIG. 5, a dual exchanger 530, 535 configuration can also, optionally include a housing 580, and further optionally include a valve 590, similarly to the embodiment illustrated in FIG. 2. Also optionally, one or more holding elements 545 may be included to prevent the frozen carbon dioxide 540 from moving in at least one direction.

In another exemplary aspect of the invention, a fuel cooling system according to any embodiment of the present invention can be an open or closed system. For example, referring to FIG. 1, in an open system, fuel source 160 and fuel destination 170 are distinct. For example, fuel source 160 can be a motor vehicle's fuel tank, and fuel destination 170 can be the combustion chambers of the motor vehicle's engine. Alternatively, in a closed system, fuel source 160 and fuel destination 170 can be one in the same. For example, fuel source 170 and fuel destination 170 can be a motorboat's fuel tank. Notably, such a system can be integrated onto a vehicle ("on-board"), but not necessarily ("off-board"). Thus, for example, a system can be disposed within an engine compartment of a motor vehicle, or located off-board in conjunction with an off-board fuel container.

It should be noted that intake, exhaust, and bridge lines can have one or more segments, and further, are to be read to include intermediate diversions. For example, as shown in FIG. 1, intake line can have a plurality of segments: one segment from the fuel source to the fuel pump 120, and a second segment from the fuel pump to heat exchanger; and further, should be read to include an intermediate diversion, such as one through a fuel pump, for example and not in limitation.

It will be apparent to one skilled in the art that the manner of making and using the claimed invention has been adequately disclosed in the above-written description of the exemplary embodiments and aspects taken together with the drawings.

It should be understood, however, that the invention is not necessarily limited to the specific embodiments, aspects, arrangement, and components shown and described above, but may be susceptible to numerous variations within the scope of the invention. Accordingly, the specification and drawings are to be regarded in an illustrative and enabling, rather than a restrictive, sense.

Therefore, it will be understood that the above description of the embodiments of the present invention are susceptible to various modifications, changes, and adaptations, and the same are intended to be comprehended within the meaning and range of equivalents of the appended claims.

Therefore, I claim:

1. A liquid fuel cooling system, said system comprising:
   an intake line connected to a fuel source, said intake line for carrying the liquid fuel from the fuel source;
   a heat exchanger having an exterior surface, said heat exchanger being connected to said intake line;
   an exhaust line connected to said heat exchanger, said exhaust line for carrying the liquid fuel away from said heat exchanger to a fuel destination;
   a fuel pump connected to said intake line, said fuel pump for moving the liquid fuel from the fuel source, through said intake line, through said heat exchanger, through said exhaust line, and to the fuel destination; and
   an amount of frozen carbon dioxide disposed against at least a portion of the exterior surface of said heat exchanger to transfer heat away from the liquid fuel.

2. The system of claim 1, said system further comprising
   a housing having a lid, an intake aperture, and an exhaust aperture;
   wherein said housing surrounds said heat exchanger and said amount of frozen carbon dioxide, said intake line connects to said heat exchanger via the intake aperture, said exhaust line connects to said heat exchanger via the exhaust aperture, and the lid is closeably openable to receive said amount of frozen carbon dioxide.

3. The system of claim 2, wherein said housing is at least substantially air-tight and said housing includes a valve for releasing air pressure from within said housing.

4. The system of claim 3, wherein the valve releases at least a portion of the air-pressure from within said housing if the air-pressure exceeds a predetermined amount.

5. The system of claim 2, wherein said fuel pump is connected directly to said intake line.

6. The system of claim 2, wherein said housing further surrounds at least one holding element that limits said amount of frozen carbon dioxide from moving in at least one direction.

7. The system of claim 6, wherein the at least one holding element is formed, at least in part, from a foam material.

8. The system of claim 1, wherein said heat exchanger includes a plurality of fins, and said amount of frozen carbon dioxide is disposed against at least one of the plurality of fins.

9. The system of claim 1, wherein the destination is the fuel source.

10. The system of claim 1, wherein the destination is a combustion chamber.

* * * * *